July 28, 1959   G. C. MOUSTAKIS   2,896,965
AUTOMATIC FLUID PRESSURE ACTUATED LEVELING
ARRANGEMENT FOR VEHICLES
Filed Feb. 4, 1957   2 Sheets-Sheet 1

Inventor:
George C. Moustakis
by Lawrence G. Norris
His Attorney

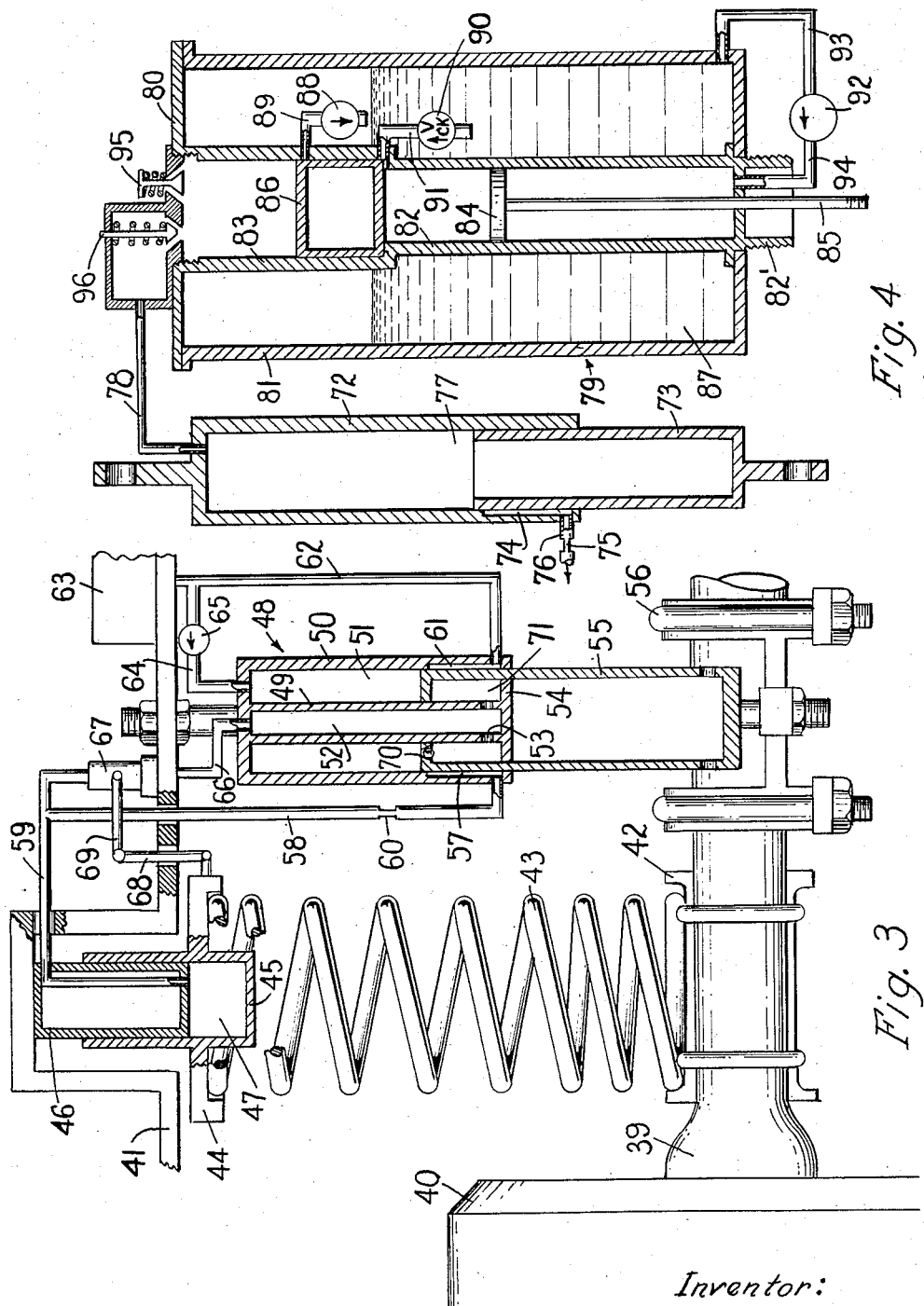

United States Patent Office 2,896,965
Patented July 28, 1959

2,896,965

AUTOMATIC FLUID PRESSURE ACTUATED LEVELING ARRANGEMENT FOR VEHICLES

George C. Moustakis, Danvers, Mass.

Application February 4, 1957, Serial No. 637,952

1 Claim. (Cl. 280—124)

My invention relates to automatic leveling means for vehicles and particularly to an arrangement for automatically controlling the level of an automobile body relative to the road surface.

One of the objects of my invention is to provide an arrangement for automatically leveling an automobile body relative to its axles, which arrangement includes improved means for accomplishing the leveling action by utilizing the relative movement between the automobile body and its axles, such movements occurring, for example, as a result of motion of the vehicle over normal roadway irregularities.

Briefly stated, I utilize, in accordance with one embodiment of my invention, an arrangement sensitive to the normal irregularities of the road surface to accomplish automatic leveling of the automobile body under various loading conditions. In this arrangement I provide a piston pumping means which is actuated by movements of the axles relative to the automobile body, and which includes automatic leveling means for controlling the average level to a preselected dimension. I also provide, in combination with the foregoing, means for automatically adjusting the automobile shock absorbing mechanism responsive to the leveling adjusting arrangement.

My invention will be better understood, and other objects and advantages thereof will be apparent from the following description taken in connection with the accompanying drawings.

Figure 1:
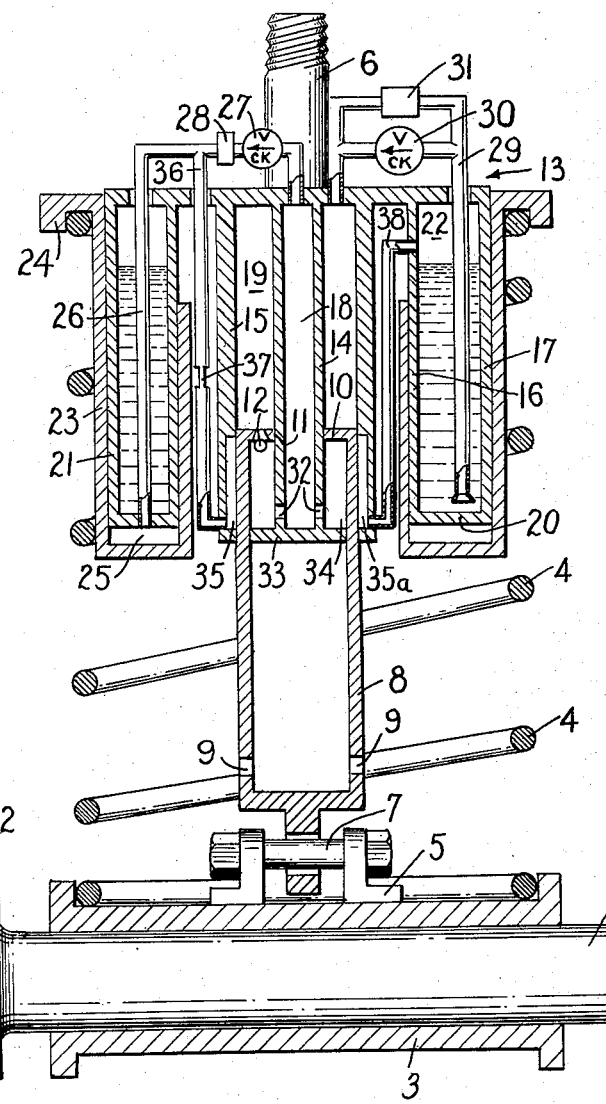
Figure 2:
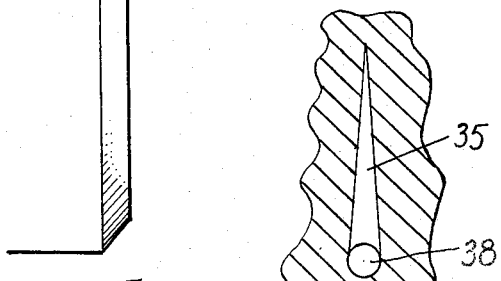

Referring to the drawings, Fig. 1 is an elevational view of an automobile suspension arrangement, taken partly in cross-section, illustrating one embodiment of my invention; Fig. 2 is a fragmentary cross-sectional view illustrating a tapered aperture arrangement for controlling the rate of the leveling action responsive to the instantaneous magnitude of the level adjustment, which arrangement forms a part of my invention; Fig. 3 is an elevational view, taken partly in cross-section, of an alternative arrangement of the embodiment of Fig. 1; while Fig. 4 is a cross-sectional, elevational view of another embodiment of my invention, in which air is employed as the level controlling medium.

Referring now to the embodiment of Fig. 1, there is shown an automobile suspension arrangement including an axle attached to a pair of wheels, one of which is shown at 2, in any suitable manner. Secured to the axle 1 is a supporting member 3 shaped to receive a suspension spring 4 on which a portion of the automobile weight rests. It will be appreciated that in the usual automobile suspensions, the weight of the automobile body resting on the springs produces a certain deflection thereof, and that when the automobile is loaded unevenly a corresponding uneven deflection of the springs occurs, the resulting tilting of the body causing discomfort to the occupants.

With the arrangement of my invention, however, this tilting of the automobile body caused by uneven loading is automatically corrected when the vehicle is put in motion and deflections of the axle 3 against the spring 4 are produced as a result of normal irregularities in the road surface. In the embodiment of Fig. 1, this arrangement is attached to the support plate 3 in any suitable manner, such as by means of a bracket arrangement 5 affixed to the plate 3. The mechanism is attached to the automobile body by means of a threaded post 6 at the upper end thereof, or in any other suitable manner.

Attached to the bracket 5 by means of a bolt 7 is a cylindrical member 8 having one or more apertures 9 therein, the purpose of which will be set forth subsequently. Secured at the upper end of the cylindrical member 8 is an end piece 10 having an aperture 11 therein. Formed in the end piece 10 is a check valve arrangement 12 which permits fluid flow into the cylindrical member 8 but blocks off fluid flow therefrom.

Attached to the automobile frame by means of the threaded post 6 is a member 13, which comprises a series of cylindrical walls 14, 15, 16 and 17. The wall portions 14 and 15 form a central fluid chamber 18 and a coaxially extending outer, annular chamber 19, while the walls 16 and 17 form, together with an end plate 20, an annular piston portion 21 having therein a fluid reservoir 22.

As will be seen from Fig. 1, the annular piston 21 engages an annular cylinder 23 which is, in turn, provided with a flange portion 24 shaped so as to receive the upper portion of the suspension spring 4. Fluid is introduced into a fluid chamber 25, formed by the engagement of the piston 21 and the cylinder 23, by means of a tube 26. The tube 26 is, in turn, connected to the fluid chamber 18 through a check valve 27 and an orifice type shock absorber 28. The check valve 27 is capable of permitting fluid flow only in the direction shown while the shock absorber 28 is of the conventional adjustable orifice type well known to those skilled in the art.

The fluid reservoir 22 is connected with the annular chamber 19 by means of tubing 29 through the parallel combination of a check valve 30 and an orifice type shock absorber 31 in the manner shown in Fig. 1. The check valve 30, as is the case with the valve 27, is capable of permitting fluid flow only in the direction shown.

Attached at the lower end of the wall 14 is a piston member 33 which engages the inner surface of the cylindrical member 8 in such a manner as to be capable of forming a chamber 34 between the piston 33 and the upper portion of the cylindrical member 8. Fluid communication between the chambers 18 and 34 is provided by means of one or more orifices 32 in the wall 14.

Formed at the inside, lower portion of the wall section 15 are two or more tapered slots or apertures 35 and 35a, the configuration of which is shown in greater detail in the fragmentary view of Fig. 2. Fluid communication between at least one of these slots 35 and the chamber 25 is established by means of a tube 36, which connects the slot to the tube 26 through a flow limiting orifice 37. The tube 36 is connected to the tapered slot 35 through an aperture 38 in the wall 15, as seen in Fig. 2.

It will be seen that, with the arrangement shown, the vertical displacement of the automobile body with respect to the axle 1 is determined by the position of the member 13 relative to the axle. The position of the member 13 relative to the axle is in turn, controlled by the position which the piston portion 21 occupies with respect to the annular cylinder 23, taking into account the deflection of the suspension spring 4. It will be observed that the displacement of the piston portion 21 with respect to the annular cylinder 23 may be controlled by porting hydraulic fluid under pressure to the chamber 25 through the tube 26.

The pumping of fluid to the chamber 25 is accomplished by oscillatory deflections of the piston 8, such as caused by movement of the vehicle over irregularities in the road surface, in the manner now to be described.

Consider first the result of upward deflection of the piston 8 caused by upward movement of the axle against the spring 4. As the piston 8 moves vertically upward, fluid is displaced from the chamber 19 through the check valve 12 into the chamber 34, the flow of fluid from the chamber 19 through the tubing 29 being blocked by the check valve 30 through one path and limited to a relatively small amount through the orifice type shock absorber 31 in another path. It will be appreciated that, by reason of the difference in annular areas between the chambers 19 and 34, the rate of decrease in volume of the chamber 19 with upward movement of the piston member 8 will be greater than the rate of increase in volume of the chamber 34. Therefore, during the upward stroke of the piston 8, fluid will be discharged through the apertures 32 into the central chamber 18, thence through the check valve 27, the shock absorber 28 and the tubing 26 into the annular chamber 25 as well as through the restrictive orifice 31 into the reservoir 22. It will be appreciated that the velocity of the piston 8 is limited during the upward stroke by the restrictive orifices of the shock absorbers 28 and 31.

On the downward stroke of the piston 8, the check valve 12 is closed by the upward pressure thereon and the fluid entrapped in the chamber 34 is forced out under pressure through the apertures 32, the chamber 18, and into the annular space 25 along the same path as described above. During this downward stroke, fluid is drawn into the chamber 19 through the tubing 29 and the check valve 30 from the reservoir 22.

It will be appreciated therefore, from the foregoing description and by reference to Fig. 1, that so long as the piston 8 remains above the level of the upper extremity of the tapered slot 35, oscillatory movement of the piston will produce displacement of fluid under pressure from the reservoir 22 into the annular chamber 25, thus forcing the member 13 upward with respect to the annular cylinder 23 and, correspondingly, with respect to the piston 8 itself. This pumping action will continue to take place until the member 13 is moved upward to the extent that the oscillatory motions of the piston 8 begin to overlap the tapered slot 35. It will be observed that when this occurs, the pressurized chamber 25 is effectively vented through the tube 36 and restrictive orifice 37 to the chamber 19 through the tapered slot 35. At this same point, the second tapered aperture 35a, which is connected through a tube 38 to the reservoir 22, is also uncovered by the piston 8, thus permitting fluid to be discharged from the chamber 19 into the reservoir. Thus, with the piston 8 oscillating at an average level below the upper extremity of the slots 35 and 35a, the weight of the automobile body resting on the member 13 will be allowed to force fluid from the chamber 25 back into the reservoir 22 along the path just described, until the relative vertical positions of the piston 8 and the member 13 return to the point where the pumping action described above can be resumed.

It will be appreciated that by the provision of the tapered slots 35 and 35a, the rate of discharge of fluid from the chamber 25 into the reservoir 22 is made a function of the vertical position of the piston 8 with respect to the slots. That is, when the piston is near the upper extremity of the slots, the cross-sectional area of the slots which is uncovered by the piston is relatively small and the discharge rate of fluid from the chamber 25 is correspondingly low. As the piston is moved further down along the slots, additional area is uncovered and the discharge rate of fluid is increased, thus increasing the rate at which the member 13 moves downward with respect to the piston 8. Thus the rate of correction is made proportional to the magnitude of the error from the equilibrium position. The maximum rate at which the settling action of the member 13 can occur is limited by the flow restrictive orifice 37 in the line 36. The provision of the apertures 9 in the lower portion of the cylinder 8 forms an air cushion against excessive movements of the cylinder 8 relative to the vehicle body in that once the piston portion 33 has moved downward beyond the apertures 9, air is entrapped in the lower portion of the cylinder 8 and is compressed by further relative movement between the vehicle axle and the frame.

It will be seen that with the arrangement just described, the member 13 seeks an equilibrium position with respect to the piston 8 in which the top of the piston is situationed near the upper extremity of the tapered slots 35 and 35a the rate at which the member 13 is moved in the upward direction being determined by the frequency and magnitude of the oscillatory motions of the piston while the rate at which downward corrections are made are determined by the magnitude of the error from the equilibrium position. At the same time, a shock absorbing action is provided against both upward and downward movements of the piston 8 and axle 1.

Referring now to Fig. 3, there is illustrated another embodiment of my invention as applied to a vehicle suspension, a portion of which suspension includes an axle 39, a wheel 40 and a body frame member 41. Attached to the axle 39 is a bracket 42 which supports a suspension spring 43. The spring 43 engages at its upper end a flange portion 44 of a cylindrical member 45 in a manner such that the position of the vehicle frame member 41 with respect to the axle 39 is determined by the position of the cylinder 45 relative to the frame member and by the deflection of the spring 43. Secured to the frame member 41 is a hollow piston 46, which forms together with the cylinder 45 a variable volume chamber 47.

Also attached to the frame member 41 is a tubularly shaped member 48 having inner and outer walls 49 and 50 respectively, forming an outer annular chamber 51 which extends coaxially with an inner chamber 52 as shown. Formed near the lower extremity of the inner wall 49 are one or more apertures 53 and immediately below these apertures is a piston portion 54 which engages the inner wall surfaces of a hollow piston member 55, the piston 55 being in turn attached to the axle 39 by means of a suitable bracket arrangement 56.

Situated at the lower portion of the wall 50 is a tapered slot 57, similar to the slot 35 shown in Fig. 2, which is connected to the fluid chamber 47 by means of tubing 58 and 59 through a flow limiting orifice 60. A second similarly tapered slot 61 is also formed in the lower portion of the wall 50 and is connected through tubing 62 to a fluid reservoir 63, which is secured to the frame member 41. Fluid communication between the annular chamber 51 and the reservoir 63 is established by means of tubing 64 through a check valve 65, which is capable of allowing fluid flow only in the direction indicated. The inner chamber of the member 48 is connected to the fluid chamber 47 through the tubing 66 and 59 and a combination shock absorber and check valve 67.

The mechanism 67 is similar in function to the series combination of the check valve 27 and the shock absorber 28 of the arrangement of Fig. 1, the fluid flow from the chamber 52 to the chamber 47 being permitted while flow in the opposite direction is blocked off. The shock absorbing action is also accomplished, as is the case with the arrangement of Fig. 1, by means of a flow limiting orifice, except that in the configuration of Fig. 3, the shock absorbing action is made adjustable responsive to the vertical position of the frame 41 relative to the axle 39 by means of the linkage elements 68 and 69 interconnecting the flange portion 44 of the cylinder 45 with the mechanism 67. A check valve 70 is provided in the upper portion of the piston 55, the operation thereof being identical to that of the check valve 12 in the embodiment of Fig. 1.

The operation of the arrangement of Fig. 3 is similar to that of the embodiment of Fig. 1 in that oscillatory movements of the piston 55 produce displacement of fluid from the reservoir 63 to the chamber 47 in the same manner as that already described in connection with the embodiment of Fig. 1. Upon the downstroke of the piston 55, the check valve 70 is closed and fluid is discharged through the apertures 53 into the central chamber 52 and thence through the check valve and shock absorber mechanism 67 into the chamber 47, the additional fluid being at the same time drawn into the chamber 51 through the check valve 65. On the upstroke of the piston 55, the check valve 70 is forced open and, by reason of the differential volume change rates between the chambers 51 and 71, fluid is again forced through the apertures 53 and into the chamber 47 through the same path just described.

The equilibrium position is also established in the same manner as set forth in the arrangement of Fig. 1 in that a leakage path between the chamber 47 and the reservoir 63 through the tubing 58 and 59, the flow limiting orifice 60, the tapered slots 57 and 61, and the tube 62 when the level of the piston 55 falls below the upper extremity of the tapered slots. Thus, oscillatory movements of the piston 55, such as produced by irregularities in the road surface, cause fluid to be pumped into the chamber 47, thereby raising the level of the frame 41 relative to the cylinder 45 and increasing the vertical elevation of the frame relative to the axle 39 until the equilibrium position just described is reached. The tapered slots 57 and 61 act in the same manner as the slots 35 and 35a, seen in cross-section in Fig. 2, in that the rate of correction for errors in position above the equilibrium level is made proportional to the magnitude of the error.

Referring now to Fig. 4, there is shown still another embodiment of my invention in which air is utilized as the working fluid, and in which I provide a pair of telescoping, open ended cylinders 72 and 73, the upper cylinder 72 being connected to the vehicle frame in any suitable manner and the lower cylinder 73 being fastened to the vehicle axle. A tapered slot or groove 74 is formed near the base of the cylinder 72 and is of the same general shape as the slots 35 and 35a shown in Fig. 2. The slot 74 is vented to atmosphere at the lower end thereof through a flow restricting orifice 75 and a tube 76 as shown. Thus, when air pressure is supplied to the arrangement just described, the cylinders 72 and 73 are forced apart until the slot 74, or at least the upper portion thereof, is uncovered and the pressurized air is allowed to escape to the atmosphere at a rate determined by the characteristics of the flow limiting orifice and by the effective area of the slot 74 as determined by the position of the piston 73 relative thereto. It will be appreciated, therefore, that the piston 73 will assume a position relative to the cylinder 72 such that the leakage flow through the slot 74 and the restrictive orifice 75 will maintain sufficient pressure in the chamber 77, formed by the cylinders 72 and 73, to balance the load thereon. This equilibrium condition will be established when the upper end of the cylinder 73 is situated somewhere near the upper extremity of the slot 74, the equilibrium position being subject to very little change with load in view of the relatively sharp area gradient presented by the tapered slot 74.

Air under pressure is ducted to the cylinder 72 by means of a tube 78, which is connected at the opposite end thereof to a pumping mechanism 79. The pumping arrangement 79 comprises two main body members 80 and 81, which are connected together by means of a nut or some similar device secured to the threaded portion 82' on the member 80. Formed within the member 80 are a pair of longitudinally displaced, concentric cylindrical portions 82 and 83. A piston 84, which is attached to the vehicle axle by means of a rod 85, is positioned to engage and move longitudinally within the cylinder 82 with deflections of the axle, the member 80 being secured to the vehicle frame.

A second, preferably hollow piston member 86 is positioned within the cylindrical portion 83 and is free to move longitudinally therewithin. The cylinder 83 is vented to a reservoir 87, formed by the elements 80 and 81, through a relief type check valve 88 and a tube 89 which extends through the cylinder 83 as shown, the check valve and shock absorber 88 being capable of permitting fluid flow only in the direction indicated. Fluid may be drawn into the cylinder 82 from the reservoir 87 through a second check valve 90, which is connected into the cylinder 82 by means of a tube 91, the check valve 90 permitting fluid flow only in the direction shown and then only when the pressure in the cylinder is below some preselected level which for the present embodiment is in the vicinity of 5 to 7 pounds per square inch.

Connected between the reservoir 87 and the portion of the cylinder 82 which is below the piston 84 is a combination check valve and adjustable orifice type shock absorber 92. The connection is accomplished by means of tubes 93 and 94 as shown. The check valve and shock absorber portions of the device 92 are connected in parallel with each other such that free flow of fluid is permitted in the direction shown but is restricted to that amount allowed by the shock absorber orifice in the opposite direction.

The operation of the arrangement just described is as follows. When the piston 84 is oscillated by deflections of the vehicle axle, the hollow piston 86 is caused to oscillate therewith in such a manner as to draw air into the cylinder 83 through a spring loaded valve 95 and discharge it under pressure through a second valve 96 into the cylinder 72. Considering first the upstroke of the piston 84, it will be observed that fluid is drawn into the cylinder 82 through the valve 92 from the reservoir 87, while at the same time, the fluid above the piston 84 is forced upward against the hollow piston 86, causing it to move upward along with the piston 84.

This upward stroke of the piston 86 compresses the air in the cylinder 83 until the pressure therein is sufficient to overcome the spring force on the valve 96, at which point the valve 96 opens and air is discharged into the cylinder 77. Upon the downward stroke of the piston 84, a reduced pressure, the minimum level of which is determined by the lowest setting of the relief type check valve 90, is created on the underside of the piston 86, creating a downward force thereon. Thus the piston 86 is caused to move downward on its suction stroke, thereby drawing air into the cylinder 83 through the valve 95.

The downward movement of the piston 86 continues until the lower limit of the cylinder 83 is reached, the discontinuity between the cylinders 82 and 83 providing a stop against further movement. It will be observed that at this point in the stroke, continued downward movement of the piston 84 will draw fluid into the chamber 82 through the relief and check valve 90. During the entire downward stroke of the piston 84, shock absorbing action is provided by the flow limiting orifice in the valve 92, which limits or restricts the fluid discharge rate from the cylinder 82 on the downward stroke, while on the upward stroke, shock absorbing action is provided by the flow limiting characteristics of the valve 88.

It will be appreciated from the foregoing description that as the piston 84 is reciprocated, air is pumped from the atmosphere into the chamber 77, increasing the pressure therein and thereby forcing the cylinder 72 upward relative to the cylinder 73 and increasing the distance between the vehicle body and its axle. Under this condition, upward movement of the cylinder 72 continues until the upper portion of the tapered slot is uncovered, at which point air is allowed to escape from the chamber 77 through the slot and the flow limiting orifice 75 at a rate determined by the characteristics of the orifice and the cross-sectional area of the exposed portion of the slot. As air is allowed to escape from the chamber 77, the pressure therein is reduced and the weight of the vehicle body causes the cylinder 72 to move downward with respect to the cylinder 73 until a pressure balance is once again established. Thus, the system seeks an equilibrium position at which the upper end of the cylinder 73 very nearly coincides with the upper extremity of the tapered slot 74. As is the case with the embodiments of Figs. 1 and 3, the rate of correction in the downward direction is made proportional to the magnitude of the error from the equilibrium position by the provision of the tapered slot or groove 74. In addition, it will be appreciated that the pumping arrangement of Fig. 4 allows a relatively large variation in the stroke of the piston 84 while maintaining a constant stroke of the piston 86, the excess in stroke in the upward direction being taken up by the fluid discharge through the valve 88, and the excess in the downward stroke being compensated for by the volume of fluid drawn into the chamber 82 through the valve 90.

It will be appreciated, of course, that my invention may be applied in other embodiments than the particular ones shown herein. For instance, my invention may be employed with other types of suspensions, such as the cantilever type. It may also be used together with variable rate coil springs, which provide a spring rate proportional to deflection to increase the spring gradient with increasing load on the vehicle suspension.

It will therefore be understood that the embodiments of my invention set forth herein are of a descriptive rather than of a limiting nature and that various modifications, substitutions and combinations may be employed in accordance with these teachings without departing from the scope of my invention in its broader aspects.

What I claim as new and desire to secure by Letters Patent of the United States is:

In a vehicle having an axle, a frame, and resilient suspension means therebetween, means for automatically controlling the elevation of at least one of said suspension points on said frame relative to the axle comprising fluid pumping means including a piston and a cylinder connected between said frame and said axle and responsive to relative movement therebetween to produce fluid flow under pressure, a piston and cylinder type actuator connected between said frame and said resilient suspension means and positioned so as to be capable of compensating for deflections of said resilient suspension under various loading conditions on said vehicle, fluid conduit means interconnecting said pumping means and said actuator, said fluid conduit means including a flow limiting type shock absorber, a fluid source connected to said pumping means, means for shunting the output of said pumping means back to said fluid source over a preselected range of relative vertical positions of the piston and cylinder of said pumping means, said shunting means including a tapered slot presenting an effective area which increases as said piston and cylinder are moved away from each other in said shunting range, fluid conduit means interconnecting said actuator and said fluid source through said shunting means, said last mentioned fluid conduit means including a tapered slot, the effective area of said last mentioned tapered slot being controlled by the relative positions of said pumping means piston and cylinder, and a flow limiting orifice in said last mentioned fluid conduit means.

References Cited in the file of this patent

UNITED STATES PATENTS

| 2,323,204 | Cross | June 29, 1943 |
| 2,592,391 | Butterfield | Apr. 8, 1952 |
| 2,756,989 | Peras | July 31, 1956 |
| 2,782,049 | Peras | Feb. 19, 1957 |

FOREIGN PATENTS

| 767,620 | France | May 7, 1934 |
| 1,079,671 | France | May 19, 1954 |